Dec. 15, 1936.   J. W. McNAIRY   2,064,621
ELECTRICAL CONTROL APPARATUS
Filed April 9, 1935   2 Sheets-Sheet 1
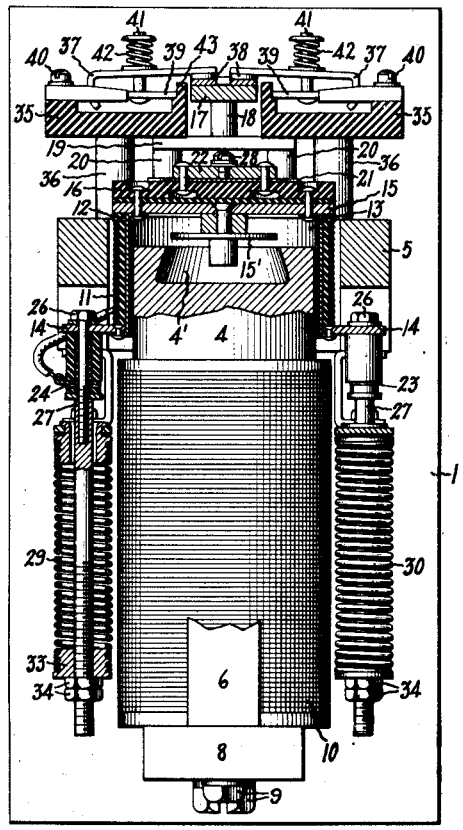
Fig. 1.
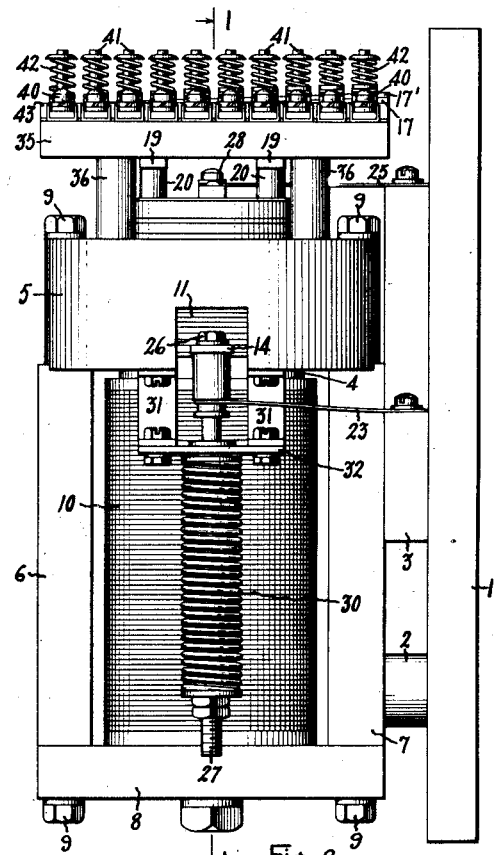
Fig. 2.
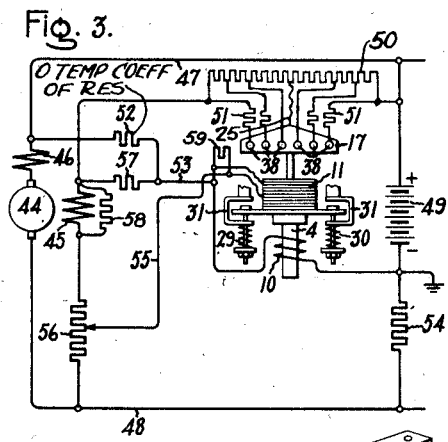
Fig. 3.
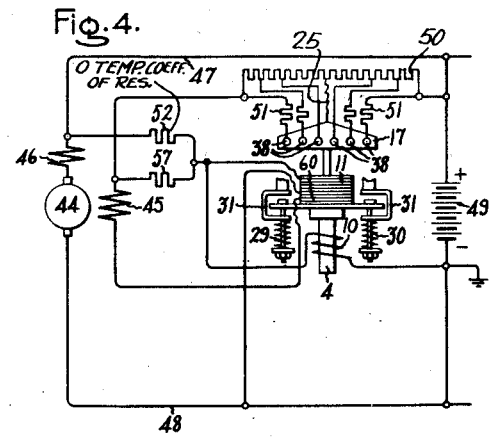
Fig. 4.
Fig. 5.
Inventor:
Jacob W. McNairy.
by Harry E. Dunham
His Attorney.

Dec. 15, 1936.   J. W. McNAIRY   2,064,621
ELECTRICAL CONTROL APPARATUS
Filed April 9, 1935   2 Sheets-Sheet 2
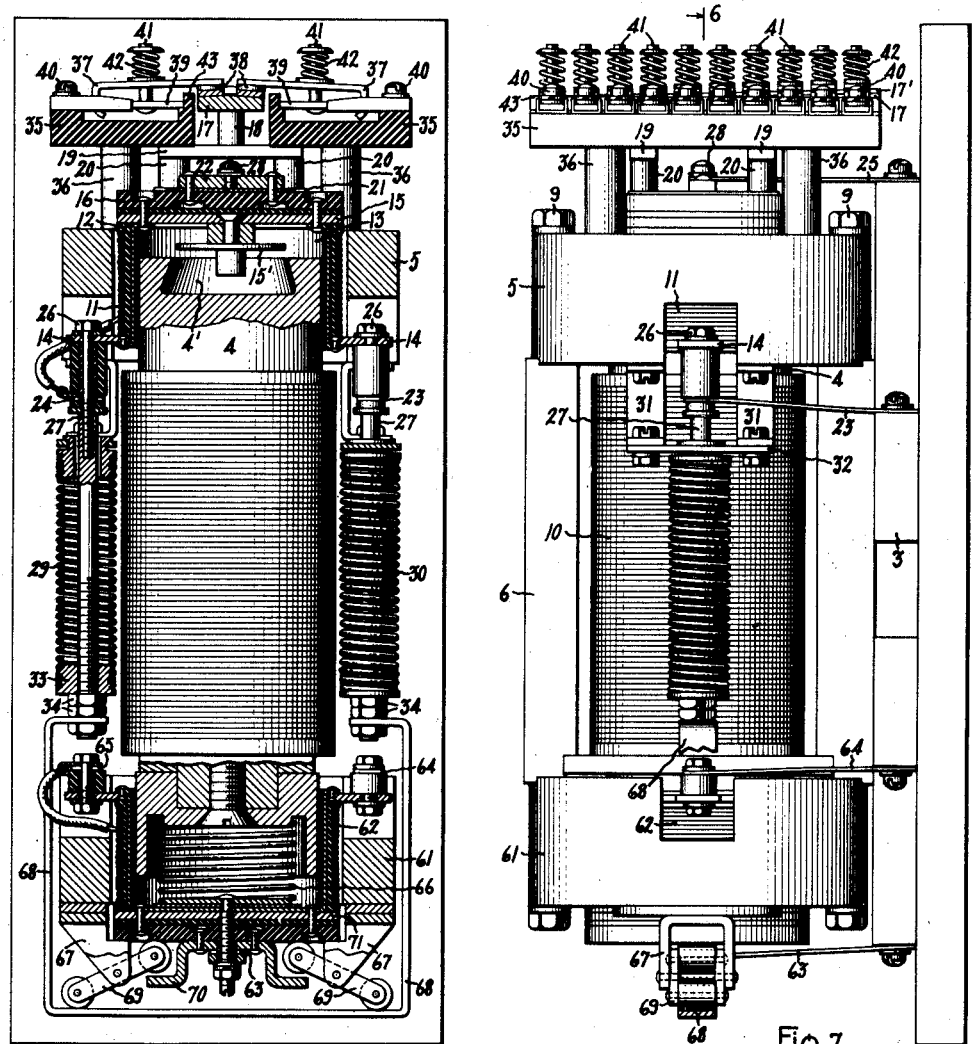
Fig. 6
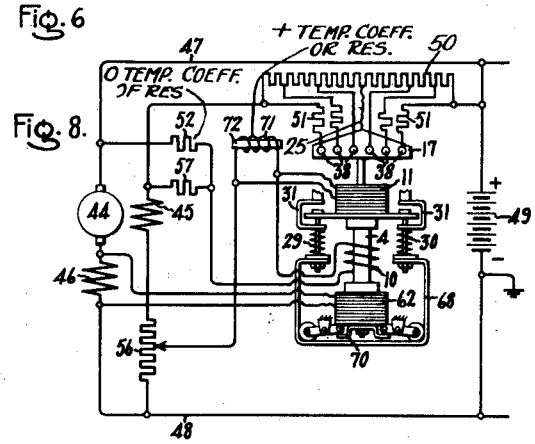
Fig. 8.
Fig. 7.
Inventor:
Jacob W. McNairy,
by Harry E. Dunham
His Attorney.

Patented Dec. 15, 1936

2,064,621

UNITED STATES PATENT OFFICE 2,064,621

ELECTRICAL CONTROL APPARATUS

Jacob W. McNairy, Erie, Pa., assignor to General Electric Company, a corporation of New York Application April 9, 1935, Serial No. 15,500

31 Claims. (Cl. 171—229)

My invention relates to electrical control apparatus and to electrical regulating systems, and more particularly to improvements in variable resistance type electrical regulators and electrical regulating systems.

My control apparatus when used as a regulator is simple and rugged in construction while at the same time it is highly sensitive. It is more stable and reliable in operation than conventional carbon pile regulators while at the same time it has the advantage over conventional vibratory contact type regulators in that the resistance change it produces takes place in a relatively large number of relatively small steps so that the regulator can be used directly in the shunt field circuit of a generator. With ordinary vibratory contact type regulators the current fluctuations produced by the relatively large resistance changes usually require that an exciter be interposed between the regulator and the field of the main regulated generator.

Although my control apparatus was originally developed as a regulator primarily for transportation applications, such as car lighting systems, modern high speed articulated Diesel engine driven trains and the like, it has also found a wide variety of other applications such as to the electrical system of air conditioning installations and to the electrical equipment for electric searchlight trucks such as are used by the army.

An object of my invention is to provide new and improved electrical control apparatus.

Another object of my invention is to provide a novel, rugged, simple and sensitive electrical regulator.

A further object of my invention is to provide a new and improved electrical control and regulating system.

My invention will be better understood from the following description taken in connection with the accompanying drawings and its scope will be pointed out in the appended claims.

In the drawings Fig. 1 is a part cross sectional front elevation view of my control apparatus taken on line 1—1 of Fig. 2; Fig. 2 is a side elevation of the control apparatus shown in Fig. 1; Fig. 3 is a simplified diagram of the circuit connections of my regulating system employing the control apparatus shown in Figs. 1 and 2; Fig. 4 is a modification of the circuit shown in Fig. 3; Fig. 5 is a detailed view of the main contact bar of the control apparatus shown in Figs. 1 and 2; Fig. 6 is a part cross sectional front elevation of a modified form of my control apparatus taken on the line 6—6 of Fig. 7; Fig. 7 is a side elevation of the modified form of control apparatus shown in Fig. 6 and Fig. 8 is a diagram of the connections of a modified form of regulating system embodying the control apparatus shown in Figs. 6 and 7.

Referring now to the drawings and more particularly to Figs. 1 and 2, my control apparatus is shown therein as supported on a base 1 which may be constructed of any suitable material, such for example as ebony asbestos insulation. Separated from the base 1 by means of suitable spacing members 2 and 3 is a magnetic circuit comprising a core member 4 which is surrounded at its upper end by a ring member 5 which is connected to the core member 4 through front and back bars of magnetic material 6 and 7 which are joined to each other and to the core 4 by means of the transverse magnetic member 8. Magnetic members 4, 5, 6, 7, and 8, which comprise the magnetic circuit, are all rigidly joined to each other by any suitable means such as by the bolts 9 which are shown. The back bar or member 7 is fastened to the base 1 by means of suitable bolts (not shown) which pass through the spacers 2 and 3.

The core member 4 is substantially circular in cross section and the inner surface of the ring member 5 is also substantially circular and is spaced from the core member 4 so as to form an air gap. Wound upon the core 4 is a stationary field or exciting coil 10 which produces a flux which passes through the core 4, transversely across the air gap between the core 4 and the ring 5, and returns to the core through the return bars 6 and 7 paralleling the core and through the transverse magnetic member 8.

Mounted in the air gap between the members 4 and 5 is a movable coil 11 which is wound around a cup-shaped body of insulating material 12 which in turn is supported by a copper or other suitable metallic cup member 13. At the bottom of the copper cup 13 is a metallic ring having opposite ears or lugs 14, while at the top of the cup 13 is a metal plate member 15, preferably of steel or other magnetic material, the purpose of which will be described hereafter. On top of the steel plate 15 there is built up by sections of insulation 16 a construction which supports a contact bar 17 on a pair of studs or sleeves 18 which in turn are bolted or screwed to transverse members 19 which are then screwed or riveted to the insulating material 16 by four studs 20. However, the studs 20 are all joined together electrically by means of a conducting plate 21 of metal, such as copper, underlying the lower end of the four supports 20. Holding the plate 21 firmly in place is a second plate 22 of iron or other suitable metal which is riveted to the insulation 16.

The movable coil assembly described above is supported and held in proper alignment throughout its range of motion in the air gap by means of flexible steel blade spring members 23, 24 and 25, the inner ends of which are all fastened to the spacing member 3 by suitable screws. The outer ends of members 23 and 24 are clamped to the ears or lugs 14 by means of bolts 26 which are threaded into second bolt members 27 and which, by means of suitable insulating spacers, clamp the outer ends of the flexible spring members 23 and 24 firmly. The upper blade spring member 25 is connected to the movable coil assembly by means of a screw 28 threaded into the plate 22. It will be seen that by this construction any two of the blade springs, which are in effect hinge members, the spacer member 3, and the movable coil assembly all four form a parallelogram, with the result that the movable coil assembly is supported in a frictionless manner while at the same time it is held in absolutely rigid alignment throughout its range of motion. Displacement of the movable element to the right or left in Fig. 1 is prevented by rigidly mounting the stationary end of the springs in slots in part 3. In addition, the terminals of the movable coil 11 are respectively electrically connected to the supporting springs 23 and 24 so that these springs serve the additional function of acting as electrical leads or lead-in conductors for the movable coil. In this manner the usual so called pig tails are eliminated. Similarly, the supporting spring member 25, as has already been shown, is electrically connected to the contact bar 17 so that this member also serves as an electrical lead-in, in place of a pig tail, from the stationary portion of the regulator to the moving contact bar 17.

The movable coil assembly is biased to its uppermost position by means of a pair of tension springs 29 and 30. These springs are fastened rigidly at their upper ends to the ring member 5 by means of suitable supports 31 which are bolted at their upper ends to the ring member 5 and at their lower ends to transverse members 32 to which the springs are fastened in any well known manner. The bolts 27, which are fastened to the movable coil assembly by means of the bolts 26, pass through holes in the transverse members 32 and thence through the springs 29 and 30, respectively. They are attached at their lower ends to the springs 29 and 30. This connection of the bolts 27 to the springs 29 and 30 may be any suitable means such as by nuts 33 which are threaded both to the bolts 27 and to the springs and which are held in place by means of the lock nuts 34. By unscrewing these lock nuts and turning the nuts 33 an adjustment of the tension of the springs 29 and 30 may be made. As stated previously, the springs 29 and 30 are tension springs and in trying to contract they pull upwardly on the lower ends of the bolts 27 and this thrust is communicated to the movable coil assembly so that when the regulator is deenergized the bars 19 will be pressed against the bottom of strips of insulating material 35. These strips of insulating material are supported from the ring 5 by four spacing members 36.

Insulating members 35 each carry a plurality of contact finger assemblies consisting of contact fingers 37 which carry on their outer ends electrical contacts 38 of any suitable material such as silver or a silver molybdenum alloy and which are hooked at their inner ends into supporting members 39 which are fastened to the insulating material 35 by binding post screws 40. Pins 41 pass between the supporting members 39 and the contact fingers 37 and springs 42 carried by the pins serve to press the contact fingers 37 downwardly into engagement with the contact bar 17.

As shown more clearly in Fig. 5 contact bar 17 has a sloping upper face. In this manner when the contact bar is in its uppermost position it engages all of the contacts 38 but as the contact bar 17 moves downwardly the contacts 38 whose supporting fingers 37 are nearest the inner flanges 43 of the insulating supporting members 35 will be stopped from further downward movement, and consequently they will disengage the contact bar 17, so that as the contact bar 17 moves downwardly it successively disengages contact fingers 37 until in its lowermost position it is out of engagement with all of the contact fingers.

The contact bar 17 may be made of any suitable material, such for example as copper. It may be faced with strips 17' for making direct contact with the contacts 38 and these strips may be made of silver or other material which is better for making and breaking circuits than is copper alone.

It will, of course, be obvious to those skilled in the art that it is not essential to my invention that the contact bar 17 be sloped and that this bar might be flat if desired and the inner flanges 43 of the insulating member 35 might be sloped corresponding to the slope of the bar 17 as shown. This would produce an exactly equivalent result of causing successive engagement and disengagement of the contact fingers by the contact bar as it moves up and down.

The field coil 10 is preferably but not necessarily arranged to saturate the magnetic circuit which it excites so that the flux across the air gap between the core 4 and the ring 5 is relatively insensitive to changes in current in the coil 10. The energization of the coil 11 is of such polarity and the current flow therein is in such direction that the reaction between the current in the coil 11 and the flux produced by the field coil 10 produces a downward force on the movable coil assembly so that when the current in the movable coil 11 attains a value which is high enough, this downward force overcomes the upward bias of the tension springs 29 and 30 and the coil 11 moves downwardly thereby causing the contacts 17 successively to disengage the contact fingers 37. The field coil 10 and the movable coil 11 may be connected either in parallel or in series or may be separately energized.

As the movable coil 11 is mounted on the copper cup 13 which moves in the same flux through which the movable coil moves, eddy currents will be set up in the copper cup 13 which tend to damp the motion of the movable coil and prevent too violent and sudden movements thereof.

It will be noted that when the movable coil is in its uppermost position the downward pressure produced by the contact fingers 37 on the movable coil assembly is a maximum as all of the contact fingers are in engagement with the bar contact 17. However, as the movable coil assembly moves downwardly and successively disengages the contact fingers the downward pressure or biasing force produced by the contact fingers becomes less and less. This tends to change the effective calibration of the regulator. One function of the steel or magnetic plate 15 is to counteract this change in contact finger pressure for as the movable coil assembly moves down the magnetic steel plate 15 comes nearer and nearer to the ring 5 and consequently the magnetic pull on the steel plate increases as the movable coil assembly moves down and this increase in downward magnetic force on the steel plate, which of course is transmitted to the entire movable coil assembly, acts to compensate for the loss in downward force or pressure produced by the successive disengagement of the contact fingers.

Another function of plate 15 is to compensate the regulator for the calibration changing effect of the increase in tension of springs 29 and 30 as the coil 11 moves downward. This can also be done by designing the air gap so that the gradient of the magnetic field matches this change in spring tension.

It will also be observed that as the contact fingers in effect pivot about their outer ends where they are hooked to the members 39 there will be a wiping action of the contacts 38 as the contact bar 17 moves up and down. This wiping action serves to keep the contact surfaces clean and bright so as to lessen the contact resistance and improve the action of the regulator.

The upper end of the core member 4 is hollowed out at 4' and the steel plate 15 carries a disc member 15' for cooperating with the hollowed out portion 4'. The function and operation of this construction is as follows: This arrangement supplements 15. The path of the flux is into 15' from the core and out through 15 to ring 5. When 15' passes to the region below the sharp corner of 4' a reversal pull toward the "up" position is obtained which compensates for otherwise too great increase on the pull of 15. Plate member 15 is affected by pull from flux going directly into 15 from the end of the core and this component is too great at the short gap, hence 15' acting in reverse.

In practice the binding posts 40 for the contact fingers may be connected to taps or sections of a regulating resistance which, for example, may be a regulating resistance in circuit with the field winding of a dynamo-electric machine to be regulated. In operation the movable coil of the control apparatus will remain substantially stationary when the number of contact fingers short circuited by the contact bar causes the effective value of the regulating resistance to be substantially exactly right for the operating conditions existing at that time. However, if operating conditions require a value of regulating resistance which is intermediate that which is obtained when two adjacent contact fingers are respectively continuously engaged by the contact bar 17 then the control apparatus vibrates between the two positions corresponding to the short circuiting of these adjacent contact fingers. Thus the control apparatus is static under certain conditions and is vibratory under other conditions.

The main operating element of the control apparatus may be referred to as a dynamic type because its essential elements are similar to the operating elements of a dynamic type loud speaker. Such an operating element is relatively sensitive to changes in energization and yet is rugged and produces relatively large forces for relatively small changes in the condition to be controlled or regulated. Thus the field or exciting winding 10 can produce a relatively high flux density magnetic field in the air gap so that relatively small changes in current in the movable coil 11 will produce relatively large changes in downward force on the coil.

By means of the electrical connections shown in Fig. 3 the control apparatus shown in Figs. 1 and 2 is arranged to regulate the voltage of a direct current generator 44. This generator may be of any well known type, such for example, as a car axle driven generator or a generator driven by an internal combustion engine. The generator is provided with a main shunt field winding 45 and is also preferably provided with a series commutating winding 46. By means of conductors 47 and 48 generator 44 is connected for charging a storage battery 49. For the sake of simplicity the generator and battery are shown directly connected together although it should, of course, be understood that in actual installations a conventional reverse current relay, or its equivalent, would be interposed between these elements so as to prevent the battery from discharging through the generator when the generator voltage is less than the battery voltage.

Connected in series with the shunt field winding 45 is a regulating resistance 50 which is divided into sections by means of taps which are connected respectively to the contacts 38. My regulator may therefore be termed a direct acting regulator in that its operating coils directly control the regulating resistance. Connected in each of the leads from the taps to the contacts 38 are individual resistors 51. The sections of the resistance 50 are unequal in resistance value, and are so proportioned that as the current through the resistance 50 changes, due to the varying number of contacts 38 which are short circuited by the contact bar 17, the resistance voltage drop in the remaining portion of the resistance 50 is substantially the same each time that the contact bar 17 engages or disengages any of the contacts 38. The value of this resistance drop is made so low as substantially to eliminate any arcing or sparking between the contacts. The function of the resistors 51 in the leads between the taps from the resistance 50 and the contacts 38 is to limit the current through any contact fingers when the total current through the regulator is in excess of the continuous current capacity of individual fingers under the operating conditions. These series resistances serve to divide the current between the fingers and cause the fingers to carry current in parallel. These resistances are usually used in combination with the last fingers to close where the field currents are maximum. In practical applications field currents as high as 35 amperes are regulated with fingers having a capacity of approximately 7 amperes each.

In the particular regulating system illustrated coils 10 and 11 are connected across the generator 44 in parallel. As shown, the connection proceeds from the positive side of the generator 44, through a series resistor 52 and a conductor 53. The current then divides, part of it flowing through the field or stationary winding 10 and back to the negative side of the generator through a resistor 54, which resistor will hereafter be referred to as the load resistor. Its function will be described later. The rest of the current flows through the movable coil 11 and then through a conductor 55 and back to the negative side of the generator through a resistor 56, which will be referred to hereafter as the compensating resistor. Its function will also be described in detail hereinafter.

The value of the resistance 52 is relatively much higher than the resistance value of the coils 10 and 11 so that, for example, 80% of the generator voltage is consumed in the resistor 52 while only the remaining voltage (20%) is applied across the operating coils of the regulator. Resistor 52 is preferably a standard commercial resistor having a substantially zero temperature coefficient of resistance. As the coils 10 and 11 are usually constructed of copper, which has a relatively high positive temperature coefficient of resistance, there would normally be a tendency for temperature error in the regulator but as the bulk of the resistance in the energizing circuit for the windings has a zero temperature coefficient of resistance the overall coefficient of the entire exciting circuit for the coils has a relatively low temperature coefficient of resistance so that substantial temperature compensation is secured. Further reduction in temperature error is obtained by operating the exciting coil at a higher temperature than the movable coil. Since the core is highly saturated the division in current between the exciting and movable coil can be altered by this difference in temperature the increase in current through the movable coil increasing the torque for a given total current. The torque is increased in direct proportion to the current in the movable element but is only reduced slightly by the corresponding decrease in current through the exciting coil. It should of course be obvious to those skilled in the art, however, that although for simplicity I have shown but a single series resistor 52 for feeding the operating coils in parallel, each of these coils may be fed separately through individual series resistors if desired without altering the principle of operation of my invention.

The series resistor 52, in addition to its temperature compensation function, also serves the purpose of reducing the voltage across the operating coils as has already been explained. This is important, because relatively small changes in voltage applied to the operating coil 11 will then produce greater percentage voltage changes thereon than if the entire circuit voltage were applied to these coils. This makes the regulator more sensitive to the voltage drops across the load and compensating resistors 54 and 56, respectively, as will be explained more fully hereinafter.

In general operation of the arrangement illustrated in Fig. 3, if the voltage of generator 44 increases for any reason, such for example as an increase in speed of its driving means (not shown), a voltage will be reached which is high enough to cause the downward pull of coil 11 to exceed the counter or upward pull of the biasing springs 29 and 30 and as the coil 11 moves downwardly it will cause successive disengagement of the contact bar 17 with the contacts 38 thereby progressively increasing the effective value of the resistance 50 in the shunt field circuit of the generator. This reduces the generator voltage with the result that the regulator will soon float at a position which causes the correct amount of resistance to be inserted in series with the shunt field winding 45 so as to maintain the voltage of the generator at a predetermined normal and constant value which is determined by the tension adjustment of springs 29 and 30. If the speed or load conditions are such that correct resistance will be obtained by any one position of the contact bar 17 the regulator will assume this position and will be stationary. However, if the correct resistance is a value intermediate two of the adjacent contacts 38 then the regulator will vibrate between these contacts so as to hold the proper effective value of resistance.

In order to prevent hunting in the regulator, which would cause objectionable fluctuation in the voltage of generator 44, and at the same time to insure that the regulator will vibrate the proper slight amount when necessary there is provided a connection for changing the energization of the movable coil 11 in accordance with the rate of change of current in the shunt field winding 45. Theoretically, the best way to do this would be by a transformer, the primary winding of which carries the shunt field current and the secondary winding of which is connected to apply a voltage to the movable coil 11. However, the permissible change in field current when a single contact 38 is closed or opened is so small that this would require a prohibitively large transformer, for the transformer would require an air gap or other means so as to prevent saturation by the direct current flowing through its primary winding. Consequently, I make use of the inductance of the shunt field winding 45, as a reactor. This is done by a connection from the positive side of the shunt field winding 45 to the positive side of the movable coil 11 through a relatively high resistor 57. As the other side of the movable coil 11 is connected to the negative side of the shunt field winding by the conductor 55 the movable coil 11 is in effect connected across the field winding 45 through the resistor 57. As a result of this connection, whenever the regulator in response to decreased voltage or generator speed decreases the value of the resistance 50 the current through the shunt field winding 45 tends to increase, this increase in current producing an inductive voltage drop across the shunt field winding 45. This inductive voltage drop as applied to the movable coil 11 will be of such direction or polarity as to cause the regulator to tend to change the resistance in the opposite direction. Thus with an increase in shunt field current there is an increase in voltage drop across the winding 45 and this increases the current in the coil 11 thereby causing the contact bar 17 to move downwardly and increase the resistance so as to reduce the current. Similarly, when the current in the shunt field winding 45 tends to decrease, due to an increase in resistance 50, the inductance voltage drop in the shunt field winding is reversed, as this voltage drop is always in a direction to tend to oppose a change in current, so that the current of the movable coil 11 is lessened, thereby causing the contact bar 17 to move upwardly and decrease the value of the resistance 50.

If the resistance value of resistor 57 is too low too great a voltage will be transmitted to the operating coil 11 and this will produce a violent action tending to cause the regulator to move in and out rapidly over the entire range of operation and thus produce hunting. Similarly if the resistance value of resistor 57 is too high its effect will be inappreciable. The proper adjustment or resistance value is such that the action of resistor 57 will correspond to the anti-hunting action of an ordinary Tirrill type regulator. In such a regulator when relatively small ordinary changes of voltage occur the corrective action will be vibratory in character while on relatively large sudden changes in voltage the regulator action is, at least during the first portion of the regulating change, substantially continuous and smooth.

Due to steady state changes in current in the shunt field winding circuit of the generator 44, there are also changes in resistance voltage drop in the shunt field winding 45 and this resistance voltage drop tends to produce an under-compounding effect on the regulator for as the shunt field current increases the resistance voltage drop increases thereby affecting the regulator in the same way as too high generator voltage does. Hence the regulator will tend to hold a lower voltage than it should as the field current increases.

One of the functions of the compensating resistor 56 is to compensate for this under-compounding effect. As the resistor 56 carries a current which is proportional to the shunt field current the voltage drop in it can be made equal and opposite to the resistance voltage drop in the shunt field winding 45, with respect to coil 11. Consequently the resistance voltage drop in the resistor 56 can be made to cancel the effect of the voltage drop in the shunt field winding 45 with respect to the movable coil 11. In operation, as the shunt field winding current increases the potential of the connection point of the conductor 55 with the resistor 56 becomes more positive and this has the effect of reducing the net potential applied to the movable coil 11.

The effects of resistors 56 and 57 also combine to produce what may be termed an electrical dashpot action. This may be explained as follows. Assume that there is a sudden decrease in generator speed. The resultant reduction in voltage will close additional regulator contacts to increase the field current. The voltage across the field is increased instantly but the current through the field does not rise until an appreciable time after these contacts have closed. The inductive voltage applied to the regulating element through resistor 57 may momentarily be higher than the sustained voltage. The increase in voltage supplied through resistor 57 tends to reduce the regulator setting, that is to say, it tends to make the regulator hold a lower voltage than it should. On the other hand, an increase in voltage across resistor 56 tends to raise the voltage setting, that is to say, it tends to make the regulator hold a higher voltage than it should. This latter increase in voltage, however, is delayed until such time as the field current builds up to the new steady state value.

It is evident, therefore, that both resistors 56 and 57 operate to lower the voltage momentarily during a sudden decrease in generator speed. Similarly, it can also be understood from the previous detailed description of the effect of the resistors 56 and 57 that the operation of these resistors is to increase the voltage setting of the regulator slightly in case of a sudden rise in speed.

The effect of this combination is to provide an electrical dashpot or damping action whereby the voltage setting of the regulator is momentarily either slightly lower or slightly higher than the final steady setting during rapid changes in speed. As soon as conditions become stable, however, the regulator setting is returned relatively slowly to its original setting. This combination, therefore, provides a regulator having inherent electrical stability by virtue of this electrical dashpot action and at the same time provides an accurate voltage setting over a wide range in speed without droop under steady state conditions.

The characteristics are such that the regulator can be compounded to hold the higher voltage at low speed, the operation being entirely stable under any rapidly changing speed conditions. The operation of the electrical dashpot action is much more rapid than would be possible with mechanical dashpots, the stability being considerably better than with mechanical dashpots having a speed of operation anywhere near that required for such service.

I have found that in commercial applications a lag, due to the electrical dashpot action, of 4% or 5% during the more rapid changes in speed is all that is required, the duration of this lag, however, being of the order of a second.

Another function of the compensating resistor 56 is to supplement the action of the magnetic plate 15 in compensating for the change in contact finger pressure throughout the range of operation of the regulator. As the contact bar 17 moves downwardly the contact finger pressure tending to push the contact 17 downward becomes less and less, as has already been explained, and as the downward movement of the contact 17 also tends to decrease the current in the shunt field winding 45, through its increasing of the resistance 50, this decrease in current can be made to increase the energization of the movable coil 11 so as to compensate for this change in contact finger pressure. This is because the voltage drop in the compensating resistor 56 subtracts from the voltage applied to movable coil 11. The connection point between the conductor 55 and resistor 56 is therefore so chosen that the voltage drop between this point and the conductor 48 is such as to not only compensate for the resistance voltage drop in the shunt field winding 45 but also to complete the compensation for the change in contact finger pressure as the regulator operates throughout its range. The main compensating effect is obtained magnetically as previously explained but this is supplemented by the compensating resistor which furnishes an easy method of making accurate adjustments. Due to the effect of the damping action of the copper cup 13, as well as to the anti-hunting action of the resistors 56 and 57, the regulator will not always respond as rapidly as the voltage of the generator changes at times when the generator speed changes very rapidly, such for example as when its driving engine has its throttle opened suddenly. At such times the voltage might momentarily attain values which were so high as to burn out or at least shorten the life of electric lamps which might be connected across the generator as in most car lighting systems. However, due to the relatively low resistance of the battery 49 small voltage changes in the generator 44 will cause relatively large and rapid changes in the current through the battery 49. This change in current is taken advantage of by the load resistor 54 so as to cause an accelerated corrective action of the regulator in response to load current changes. Thus if the voltage of generator 44 increases rapidly the current through the load which must also pass through the load resistor 54 causes a voltage drop in this resistor but this voltage drop acts oppositely on the movable coil 11 with respect to the voltage drop in the compensating resistor 56. Thus the voltage drop in the load resistor 54 corresponds substantially entirely to the increase in generator voltage because the voltage drop across the battery is almost independent of the current over the practical range of operation encountered. This voltage, while relatively small, will be an appreciable percentage of the voltage supplied to the movable coil 11 due to the fact that the voltage applied to this coil is but a relatively small percentage of the total generator voltage. The voltage drop across the resistor 52 will be of such polarity as in effect to make the potential of the point where the conductor 55 connects to the resistance 56 a lower potential as the load current increases and this therefore increases the net voltage applied to the movable coil 11. Consequently rapid increases in load current increase the voltage applied to the movable coil 11 equally rapidly thereby causing the regulator to decrease the generator voltage quickly.

If desired, a damping resistor 58 may be connected in parallel with the shunt field winding 45. This resistor serves to bypass some of the current from the shunt field winding 45 and has the effect of reducing the voltage drop across this field winding when the current changes and thereby reducing the rate of change of current in the field winding 45. Consequently, the rate of change of generator voltage is reduced and this is sometimes helpful in preventing lamp flicker.

Similarly, the damping resistor 59 may be connected in parallel with the movable coil 11. This resistor acts in a manner similar to a short circuited turn on the winding 11 and such a short circuited turn is the equivalent of the copper cup 13. Consequently, the damping resistor 59, which acts with respect to the winding 11 in a manner similar to the way the damping resistor 58 acts to the winding 45, serves to supplement the damping action of the copper cup 13.

Fig. 4 differs from Fig. 3 mainly in that instead of utilizing the compensating resistor 56 an auxiliary winding 60 is applied to the regulator along with the main or movable operating winding 11. The winding 60 is connected to carry a current which varies in accordance with the shunt field winding current so as to compensate for the effect of the connection produced by the resistor 57 and also to compensate for the variation in contact pressure. The detailed changes in the connections and operation of Fig. 4, with respect to Fig. 3, are as follows. From the lower end of shunt field winding 45 a conductor leads to coil 60, the other end of which is connected to conductor 48 by a common return conductor for this winding and for winding 11. Windings 11 and 60 act in opposition so that increases in field current decrease the effect of winding 11 and vice versa. Consequently the effect of winding 60 is equivalent to the effect of resistor 56. Load resistor 54 has also been omitted from Fig. 4 as it is not necessary in all cases.

Figs. 6 and 7 differ from Figs. 1 and 2 in that they show a current limit feature added at the bottom of the regulator. This current limit element consists essentially of a ring of magnetic material 61 which is similar to the ring 5 but which is placed around the bottom end of the core member 4 and which replaces the transverse magnetic bar 8 of Figs. 1 and 2. In the air gap between the ring 61 and the lower end of the core 4 is a movable coil 62 wound on a movable coil assembly which is in substance the same as the upper movable coil assembly. This lower movable coil assembly is supported by flexible spring members 63, 64 and 65 which produce a parallelogram construction similar to that employed in connection with the upper movable coil. The springs 64 and 65 also serve as electrical leads for the electrical connections to the coil 62. Between the core 4 and the inner bottom surface of the movable coil assembly there is a biasing spring 66 serving to urge the movable coil assembly outward against stops 67.

This current limit movable coil assembly is arranged to produce a mechanical bias on the upper or voltage responsive movable coil assembly by means of a yoke 68 joining the lower ends of the bolts 27 and passing beneath the lower end of the lower movable coil assembly. Pivoted levers 69 are arranged to bear on the bottom transverse member of the yoke 68 while a hook member 70 carried by the lower movable coil assembly engages the inner ends of the pivoted lever members 69. Consequently, as the energization of the lower movable coil 62 is increased beyond a point where the upward pull of the coil exceeds the downward force of the compression spring 66 the movable coil assembly will move upward thereby applying through the levers 69 a downward force to the yoke 68 which in turn is transmitted through the bolts 27 to the upper movable coil assembly. It will be seen that the connection between members 69 and yoke 68 forms a one way linkage whereby only a downward, and not an upward, force is applied to the yoke.

By energizing the lower movable coil 62 in accordance with the load current of the regulated generator this lower assembly may come into play at a predetermined current value and cause the regulator to reduce the excitation of the regulated machine so as to reduce the voltage in response to currents above the predetermined setting.

The construction of the lower movable coil assembly is such that the movable coil 62 floats, throughout its range of positions, at the given critical value of current. In other words, at a value of current in the coil 62 which just balances the downward force of the spring 66 the movable coil assembly will remain stationary in any one of its positions throughout its range of motion. This is obtained by using a magnetic disc 71 which changes the pull with position to compensate for increasing tension of spring 66. Consequently as soon as the current exceeds this value the biasing force applied to the voltage regulating elements will be the same throughout their range of positions.

With the above construction it will be seen that the field or exciting coil 10 is common to both the voltage regulating movable coil and the current limit responsive movable coil and provides the main operating flux for both of these coils.

Fig. 8 shows a connection diagram of a system embodying the regulator of Figs. 6 and 7. This figure differs from Fig. 3 in two main particulars. The first is that the load resistor 54 is replaced by the current limit feature comprising the current limit coil 62. This coil is connected so as to be responsive to the current of the generator 44 in any suitable manner, such for example as connecting it in shunt to the commutating field 46. In this manner the current limit coil 62 is responsive to the value of the current and also to the rate of change of the current as the winding 46 being inductive will produce an inductive voltage drop proportional to the rate of change of the current. This makes the current limit elements very sensitive in operation. As has already been explained, the operation of the current limit feature is such that if the current exceeds a predetermined maximum or safe value the coil 62 moves upward thereby causing a downward force or bias on the voltage responsive operating element of the regulator whereby the resistance 50 is inserted in the shunt field circuit thereby reducing the voltage of the generator which in turn limits the current.

The second main difference between Fig. 8 and the other connection diagrams is that the operating coils 10 and 11 are not connected in parallel. The connection is from the positive side of the generator through the series resistor 52 thence through the exciting coil 10 and through the winding 11 and back to the negative side of the generator through the compensating resistor 56.

In order to improve the temperature compensation of the regulator a resistor having a relatively high positive temperature coefficient, such for example as nickel wire, is connected in parallel with the movable coil 11. As the temperature of the regulator increases the resistance of resistor 71 increases faster than the resistance of coil 11 thereby sending a greater proportion of the current through the coil 11. This makes up for the loss of current caused by the increase in resistance of the coil 10. Changes in current in coil 19 produce no appreciable effect on the regulator as the coil 10 has already caused saturation of the magnetic circuit which it excites. If desired, the temperature compensating resistor 71 may be wound on a copper rod or other suitable means for providing thermal storage. This rod is shown at 72.

For the parallel connection of the field and movable coils 10 and 11 no additional temperature compensation other than series resistor 52 is necessary. This is because the field coil 10 generally runs slightly hotter than the movable coil 11 and as they are in parallel and both have positive temperature coefficients of resistance, the effect of increase in temperature is to cause a greater proportion of the current to flow through the movable coil which makes up for the increase in resistance in the movable coil.

The car contact 17 has been shown in Figs. 6 and 7 as being somewhat wedge-shaped in cross section. This tends to give a better wiping action of the contacts.

Although I have illustrated my regulator as controlling only a self-excited direct current generator it will be obvious to those skilled in the art that it is also applicable to separately excited direct current generators, or to exciters of alternating current machines. In the latter case it would be preferable to interpose suitable rectifying means in the supply circuit to the operating coils as is customary when regulators are adapted for alternating current service.

While I have shown and described particular embodiments of my invention, it will be obvious to those skilled in the art that changes and modifications may be made without departing from my invention and I therefore aim in the appended claims to cover all such changes and modifications as fall within the true spirit and scope of my invention.

What I claim as new and desire to secure by Letters Patent of the United States is:

1. In an electrical control apparatus, a dynamic type main control element having a movable coil arranged to move in a magnetic field produced by a field coil, a support substantially parallel to the axis of said field coil, and a pair of flexible steel blade springs extending between said support and said main coil at substantially right angles to said support and to the axis of said movable coil, the ends of said movable coil being connected, respectively, to said springs.

2. In an electrical control apparatus, a dynamic type main control element having a magnetic core with an air gap, a field coil on said core, a movable coil in said air gap, a spring for urging said movable coil in one direction through said air gap, means for determining that the relative directions of current flow in said coils is such as to produce a force on said movable coil in the opposite direction to the force produced by said spring, and magnetic means carried by said movable coil for producing a changing magnetic force on said movable coil with changes in its position which opposes the change in force of said spring with changes in position of said movable coil.

3. In an electrical control apparatus, a dynamic type main control element having a movable coil arranged to move in a magnetic field produced by a field coil, a spring urging said movable coil in one direction, a contact arranged to be moved by said movable coil, a plurality of contacts for engaging said movable coil operated contact, means for urging said plurality of contacts into engagement with said movable coil operated contact in such direction that forces are produced on said movable coil which oppose the force of said spring, said contacts being so arranged that as said movable coil moves in a direction to increase the force of said spring said movable coil operated contact successively disengages said plurality of contacts whereby the forces produced by said contacts on said movable coil are decreased, and magnetic material carried by said movable coil for producing changes in magnetic force on said movable coil with changes in its position which oppose the changes in contact force on said movable coil caused by changes in its position.

4. In an electrical control apparatus, a magnetic core structure having two air gaps, a field coil on said core, a movable coil in one air gap, resistance regulating means controlled by said movable coil, a second movable coil in the other air gap, and a one way linkage mechanically inter-connecting said movable coils in such a way that the second coil can apply a force to the first coil in but one direction.

5. In an electrical control apparatus of the variable resistance type, a movable resistance controlling member, and means for biasing said member in one direction under abnormal operating conditions comprising a dynamic element having a field coil and a movable coil, means so relating said coil that the force produced by the movable coil is independent of its position within its normal range of motion, and a one way mechanical linkage connecting said movable coil to said movable member.

6. In an electrical control apparatus, a magnetic core structure having two air gaps, a movable voltage responsive control winding in one of said air gaps, a movable current responsive current-limit winding in the other of said air gaps, said current responsive winding being so related to its air gap that the force produced is substantially independent of its position, and a mechanical inter-connection between said voltage and current responsive windings.

7. In combination, a regulating resistance adapted to be connected in a shunt circuit with respect to a substantially constant voltage circuit, said regulating resistance being divided into sections, contacts connected to said sections, a contact member for successively short circuiting said sections, said sections being of such unequal and low resistance values as substantially to eliminate arcing between said contacts and said contact member.

8. In a constant voltage regulating system for a self excited direct current generator having a shunt field winding, a regulating resistance in series with said winding, said resistance being divided into unequal sections, contacts connected to said sections through individual unequal resistors, a voltage regulator operated contact member for successively engaging said contacts, said resistance sections and said individual resistors being so proportioned that the voltage drops thereacross are low enough so as substantially to eliminate arcing between said contacts and said contact member.

9. In a car lighting system, a generator having a shunt field winding, a regulating resistance in series with said field winding, said resistance being divided into unequal sections, contacts connected to said sections, a voltage regulator responsive to the voltage of said generator for successively short circuiting said contacts, said resistance sections being so proportioned that the successive short circuiting of said contacts produces changes in voltage of said generator which are insufficient to produce lamp flicker.

10. In an electrical control device, a main control element having a movable member, a wedge-shaped contact arranged to be moved by said movable member, said contact having downwardly sloping sides, a plurality of individually movable contacts biased against said downwardly sloping sides whereby motion of said wedge-shaped contact causes a wiping action between said wedge-shaped contact and said plurality of individually movable contacts.

11. In a regulating system, a regulating resistance for controlling the current in an electric circuit, movable means responsive to a condition to be regulated for varying the value of said resistance, mechanical means included in said resistance varying means for applying a biasing force to said means which varies with the value of said resistance, and electrical means responsive to the value of the current in said circuit for compensating said movable means for said variable biasing force.

12. In a variable resistance type voltage regulating system, a generator shunt field winding circuit having a regulating resistance, a plurality of contact fingers connected at intervals to said resistance for dividing it into sections, a contact member for successively and cumulatively engaging said contact fingers by pressing against them in such a way that a mechanical force is exerted on said contact member which increases with the number of contact fingers it engages, a regulator for operating said contact member, and means responsive to current changes in said shunt field winding circuit for compensating said regulator for said contact finger produced variable mechanical force.

13. In a voltage regulating system, in combination, a direct current generator having a shunt field winding, a regulating resistance in circuit with said field winding, a direct acting generator voltage responsive electromagnetic regulator for varying the value of said resistance, means inherent in said regulator for producing a biasing force thereon which varies inversely with the value of said resistance, a compensating resistance in circuit with said shunt field winding, and connections for applying the voltage drop across said compensating resistance to said electromagnetic regulator in such direction as to cause compensation for said biasing force.

14. In an electrical regulator, a dynamic type operating element having a movable coil mounted for motion in a magnetic field produced by a stationary field coil, a plurality of spring biased contact fingers, a contact operated by said movable coil for variably engaging said contact fingers, and a second movable coil on said regulator for compensating it for variations in contact finger pressure on said movable coil operated contact.

15. In a regulating system, a dynamo-electric machine having a direct current field winding, a regulator for controlling the current in said winding, a winding for operating said regulator, and connections for applying a voltage proportional to the voltage drop across said field winding to said regulator operating winding in such a direction as to oppose the action of said regulator.

16. In a regulating system, a dynamo-electric machine having a field winding, a regulator having a dynamic type operating element for controlling the current in said field winding, said element having a voltage responsive movable coil, and connections including a resistor for applying to said movable coil a voltage proportional to the voltage drop across said field winding in such a direction as to tend to reverse the direction of operation of said operating element so as to set up a vibratory action.

17. In a regulating system, a regulator having an operating coil for controlling the current in a dynamo-electric machine field winding circuit, means responsive to the rate of change of current in said circuit for producing vibratory action of said regulator, said means also being responsive to the value of current in said circuit for tending to undercompound said regulator, and additional means responsive to the current in said circuit for compensating said regulator for the undercompounding effect of the first means.

18. In a regulating system, a regulator having an operating coil for controlling the current in a dynamo-electric machine field winding, means for applying to said coil a voltage which is proportional to the voltage drop across said field winding and in a direction to oppose the action of said regulator, and means for applying to said coil a voltage which is proportional to the current in said field winding and in such direction and magnitude as to compensate said coil for the component of the first mentioned voltage which corresponds to the resistance voltage drop across said field winding.

19. In a regulating system, an electromagnetic regulator for controlling the current in a dynamo-electric machine field winding circuit, said regulator being constructed so as inherently to change its effective calibration throughout its range of operation, means responsive to the rate of change of current in said circuit for producing vibratory action of said regulator, said means also being responsive to the value of current in said circuit for tending to undercompound said regulator, and additional means responsive to the current in said circuit for compensating said regulator for said change in its effective calibration and for said undercompounding effect.

20. In combination, a dynamo-electric machine field winding, a voltage regulator having a voltage responsive operating coil for controlling the current in said field winding, said regulator having a plurality of successively engageable contact fingers for producing variable biasing forces in said regulator tending to change its effective calibration, connections including a resistor for applying to said operating coil a voltage proportional to the voltage drop across said field winding and in such a direction as to oppose the action of said regulator so as to set up a vibratory operation thereof, and connections including another resistor for applying to said operating coil a voltage proportional to the value of current in said field winding and in such direction and magnitude as to compensate said regulator for said variations in contact finger produced force as well as for the portion of the voltage which is proportional to the voltage drop across said field winding which corresponds to the resistance voltage drop across said winding.

21. In combination, an electrical regulator which varies the current in an inductive direct current circuit, and electrical damping means for said regulator comprising means for opposing the action of the regulator in accordance with the rate of change of current in said circuit combined with means for aiding the operation of the regulator in accordance with the value of current in said circuit.

22. In combination, a variable resistance type electrical regulator having an operating winding, a circuit the current in which is controlled by said regulator, and electrical damping means for said regulator comprising means for applying to said coil a voltage which varies in accordance with the inductance voltage drop in said circuit combined with means for applying to said coil an opposite voltage which varies in accordance with the resistance voltage drop in said circuit.

23. In an electrical regulator, a dynamic type operating element comprising a movable coil mounted for motion in a magnetic field produced by a stationary field coil, a positive temperature coefficient of resistance resistor connected in parallel with said movable coil, and a series connection between said field coil and said resistance.

24. In a voltage regulating system, a circuit whose voltage is to be regulated, a voltage regulator having an operating coil connected across said circuit, a resistor in series with said coil for absorbing most of the circuit voltage, a resistor in said circuit, and connections for applying the voltage drop across said resistor to said coil.

25. In combination, a direct current generator which is subject to relatively sudden speed changes, a storage battery, connections for charging said battery from said generator, a voltage regulator for said generator, said regulator having an operating coil connected across said generator, a relatively high substantially zero temperature coefficient of resistance resistor connected in series with said coil for absorbing most of the generator voltage whereby the voltage applied to the operating coil is a relatively small fraction of the generator voltage, a resistor in circuit with the generator and battery, and connections for applying the voltage drop across said resistor to said coil in such a direction as to cause the regulator to change the generator voltage so as to reduce sudden changes in current as a result of sudden changes in the speed of said generator.

26. In an electrical control device, an electromagnetic member for producing a magnetic field, a movable conductor mounted for movement in said magnetic field, yieldable means for determining the path of movement of said movable conductor in said field, a plurality of individually movable contact fingers, and a contact member movable with said movable conductor for causing successive engagement between the several contact fingers and said contact member for movement of said movable conductor in one direction and successive disengagement between said fingers and said contact member for movement of said movable conductor in the opposite direction.

27. In an electrical control device, an electromagnetic member for producing a magnetic field, a movable conductor mounted for movement in said magnetic field, yieldable means for determining the path of movement of said movable conductor in said field, a plurality of individually movable contact fingers, a contact member movable with said movable conductor for causing successive engagement between the several contact fingers and said contact member for movement of said movable conductor in one direction and successive disengagement between said fingers and said contact member for movement of said movable conductor in the opposite direction, and means for causing vibratory movement of said contact member between adjacent contact fingers.

28. In an electrical control device, an electromagnetic member for producing a magnetic field, a movable conductor mounted for movement in said magnetic field, yieldable means for determining the path of movement of said movable conductor in said field, a plurality of individually movable contact fingers, a contact member movable with said movable conductor for causing successive engagement between the several contact fingers and said contact member for movement of said movable conductor in one direction and successive disengagement between said fingers and said contact member for movement of said movable conductor in the opposite direction, and electrical means for damping the movement of said movable conductor.

29. In a resistance regulator, a regulating resistance divided into sections, contacts connected to the terminals of said sections, a contact member for successively engaging said contacts and cumulatively short-circuiting said sections, and separate resistors between said contacts and the sections of said regulating resistance for controlling the division of current through said contacts.

30. In a resistance regulator, a regulating resistance divided into sections, contacts for successively short-circuiting said sections, and separate unequal resistors connected between said contacts and the sections of said regulating resistance in such a manner as to force a substantially equal division of current between contacts which are short-circuiting sections of said regulating resistance.

31. In a resistance regulator, a regulating resistance divided into unequal sections, contacts for successively short-circuiting said sections, separate unequal resistors connected between said contacts and the sections of said regulating resistance, said unequal sections of the regulating resistance being so proportioned as to produce substantially equal voltage drops in the non-short-circuited sections, said separate unequal resistors being so proportioned as to force substantially equal current division among the contacts which are short-circuiting sections of said regulating resistance.

JACOB W. McNAIRY.